(12) United States Patent
McClure et al.

(10) Patent No.: US 8,996,821 B1
(45) Date of Patent: Mar. 31, 2015

(54) METHODS AND SYSTEMS FOR PROVIDING RESOURCE SHARING THROUGH FILE DESCRIPTOR ISOMORPHISM

(75) Inventors: Steven T. McClure, Northborough, MA (US); Steven R. Chalmer, Auburndale, MA (US); Brett D. Niver, Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 713 days.

(21) Appl. No.: 11/011,177

(22) Filed: Dec. 15, 2004

(51) Int. Cl.
*G06F 12/00* (2006.01)
*G06F 13/00* (2006.01)
*G06F 13/28* (2006.01)
*G06F 21/50* (2013.01)

(52) U.S. Cl.
CPC ...................................... *G06F 21/50* (2013.01)
USPC .......................................................... 711/147

(58) Field of Classification Search
None
See application file for complete search history.

(56) References Cited

U.S. PATENT DOCUMENTS

| | | | |
|---|---|---|---|
| 5,968,134 A * | 10/1999 | Putzolu et al. | 709/238 |
| 6,163,806 A | 12/2000 | Viswanathan et al. | |
| 6,170,018 B1 * | 1/2001 | Voll et al. | 719/330 |
| 6,298,390 B1 * | 10/2001 | Matena et al. | 719/315 |
| 6,687,903 B1 | 2/2004 | Chalmer et al. | |
| 6,728,962 B1 | 4/2004 | Chalmer et al. | |
| 7,197,516 B1 * | 3/2007 | Hipp et al. | 1/1 |
| 2006/0004684 A1 * | 1/2006 | Kime | 707/1 |

OTHER PUBLICATIONS

Callari, F. Process Description and Control—IV. Archive.org date of Apr. 15, 2000. http://www.cim.mcgill.ca/~franco/OpSys-304-427/lecture-notes/node17.html.*
Galassi et al. Guile Reference Manual. Archive.org date of Dec. 14, 2000. http://www.nada.kth.se/~mdj/guile-ref/guile-ref_toc.html.*
J. Moffett and M. Sloman, Policy Hierarchies for Distributed Systems Management. IEEE Journal on Selected Areas in Communications, 1993. 11: p. 1404-1414.*
Marc Shapiro. Soul: An object-oriented OS framework for object support. In Workshop on Operating Systems for the Nineties and Beyond, Dagstuhl Castle, Germany, Jul. 1991. Springer-Verlag.*
G. Banga, P. Druschel, and J. C. Mogul. Resource containers: A new facility for resource management in server systems. In Proceedings of OSDI '99, pp. 45-58, 1999.*
Fork. The Single UNIX Specification, Version 2. 1997. Archive.org date of Sep. 5, 2004. The Open Group. http://opengroup.org/onlinepubs/007908775/xsh/fork.html.*

(Continued)

*Primary Examiner* — Yaima Rigol
(74) *Attorney, Agent, or Firm* — Muirhead & Saturnelli, LLC

(57) ABSTRACT

Methods and systems are disclosed for providing resource sharing in a computing environment using file descriptor isomorphism. The methods and systems may perform a method in a computing environment having processor systems executing processes. The method may include receiving a request from a first process to access a first resource. Further, the method may include generating a first Global File Descriptor (GFD) that references a first entry in a GFD table, the first GFD entry including a reference to a first entry in a resource descriptor table pointing to the first resource. Based on the request, at least one GFD field associated with the first GFD entry is configured. Thus, methods and systems may manage access by the first process to the first resource using the first GFD entry.

20 Claims, 10 Drawing Sheets

(56) References Cited

OTHER PUBLICATIONS

Woods, Greg A. "Re: ATRN, connection cacheing (was: ETRN too fast!)". Neohapsis Postfix Discussion archives. Sep. 2000. Accessed Aug. 28, 2009. http://archives.neohapsis.com/archives/postfix/2000-09/1476.html.*

Rosenthal, David, S. H., "Evolving the Vnode Interface", Proceedings of the Summer 1990 USENIX Conference, Anaheim, 1990.*

Skinner, G. C. and Wong, T. K. 1993. "Stacking" Vnodes: a progress report. In Proceedings of the USENIX Summer 1993 Technical Conference on Summer Technical Conference—vol. 1 (Cincinnati, Ohio, Jun. 21-25, 1993). USENIX Association, Berkeley, CA, 1-27.*

* cited by examiner

US 8,996,821 B1

METHODS AND SYSTEMS FOR PROVIDING RESOURCE SHARING THROUGH FILE DESCRIPTOR ISOMORPHISM

TECHNICAL FIELD

The present invention generally relates to operating system computing environments and, more particularly, to systems and methods for providing resource sharing through file descriptor isomorphism.

BACKGROUND

The demand for quicker and more efficient processing capabilities continues to increase in today's business environments. As such, computing system designs have evolved to address these demands. In one aspect, operating system platforms are constantly being redesigned to help manage the access to data and devices leveraged by host computing systems. Typical operating system platforms perform many basic tasks, such as processing input data, providing output data, managing files and directories stored in memory, and controlling peripheral devices, such as printers, disk drives, sockets, etc. Computing systems that leverage multiple processors to perform many tasks may employ operating systems that perform multi-user, multiprocessing, multitasking, and/or multithreading operations that enable multiple users, programs, or threads to access data and devices concurrently.

One type of multiprocessing operating system is Unix. Like most operating systems, Unix orchestrates various components of a host computing system, such as processors, memory, disk drives, input and output devices, etc. Additionally, Unix provides systems with multi-user and multitasking capabilities that offer efficient access to data and devices. The core of the Unix operating system is the kernel. This component is software that controls allocation of resources during runtime of a host computing system. It tracks the availability of resources and provides communication functions to enable multiple programs to communicate with these resources. Because today's markets demand more efficient processing capabilities, Unix and other similar multiprocessing operating systems are popular choices for resource provision system environments.

Some computing systems that provide resource sharing through its operating system platform may do so using a file system that defines devices as files. Processes executing in the computing system may access these files using descriptors that point to particular devices through the file system. Although such arrangements allow for multiple processes to have access to the same file (e.g., device), problems may arise when these processes must share information associated with a common device. For instance, consider a situation where a first process uses a file descriptor to access a first device within a computing system environment. While accessing the first device, the device may recognize a particular state associated with the first process. Problems occur when the first process requires a second process to access the same device to perform a task in relation to the current state recognized by the device for the first process. When the second process accesses the first device, the device recognizes a different state for the second process. Accordingly, although both processes may access the same device, they are operating at different states in relation to that device. Such inconsistencies may result in incorrect operations being performed during runtime processing. Accordingly, there is a need for an operating system that overcomes these problems and provides consistent and efficient resource sharing in a multiprocessing computing environment.

SUMMARY

The present invention is directed to methods and systems that provide resource sharing in a computing environment. In one aspect of the present invention, a computer-implemented method is disclosed for providing resource sharing in a computing environment having processor systems executing processes. The method may include receiving a request from a first process to access a first resource. Further, the method may include generating a first Global File Descriptor (GFD) that references a first entry in a GFD table, the first GFD entry including a reference to a first entry in a resource descriptor table pointing to the first resource. Based on the request, at least one GFD field associated with the first GFD entry is configured. Thus, methods and systems may manage access by the first process to the first resource using the first GFD entry.

In another aspect, methods and system may perform a method for providing shared access to resources in a computing environment including a first process and a second process each associated with a first process descriptor table and a second process descriptor table, respectively. The method may include managing access by a first process to a first resource using a Global File Descriptor (GFD) that references a first GFD entry in a GFD table. The first GFD entry references a first entry in a resource descriptor table pointing to the first resource. Further, the method includes passing, by the first process to a second process, a duplicate GFD corresponding to the first GFD, the duplicate GFD pointing to the first GFD entry in the GFD table. Based on the first GFD entry, methods and system may manage access by the first and second processes to the first resource such that the first and second processes operate with the most current state information associated with the first resource.

In yet another aspect, methods and system may perform a method for providing shared access to resources in a computing environment. The method may include managing access to a first resource through a Global File Descriptor (GFD) that points to a first GFD entry in a GFD table. The first GFD entry may include a reference that points to a first resource entry in a resource descriptor table referencing the first resource. The method may also include generating, by the first resource, a second GFD that points to a second GFD entry in the GFD table. In one aspect, the second GFD entry includes a reference that points to a second resource entry in the resource descriptor table. Based on the first and second GFD entries, methods and system may manage access to the first and second resources.

Further, aspects of the invention include a system for providing shared access to resources in a computing environment. The system may include a memory and a processor. In one aspect, the memory includes a process file descriptor table including an entry that includes a first Global File Descriptor (GFD). The process file descriptor table may be associated with a first process executing in the computing environment. The memory may also include a GFD table that includes a set of GFD entries that each include resource descriptors associated with resources and a resource descriptor table including resource entries that point to respective resources in the computing environment. The processor may execute program code for managing access by the first process to a first resource by creating a first GFD entry in the GFD table associated with the first GFD. In one aspect, the first GFD entry includes a reference to a first resource entry in the resource descriptor table. Further, the first resource entry points to the first resource.

Aspects of the invention further include a computer-readable memory device encoded with a data structure arrangement for managing access to resources in a computing environment having processor systems that perform processes and an operating system that manages access by the processes to the resources. The data structure arrangement may include a first data structure associated with one of the processes and including one or more Global File Descriptors (GFD). Further, the data structure arrangement may also include a second data structure including a set of GFD entries. Each GFD entry may be referenced by a corresponding GFD maintained in the first data structure. Moreover, each GFD entry includes GFD field data having information reflecting the number of times the GFD entry has been referenced by the first data structure and a resource descriptor. The data structure arrangement may also include a third data structure including a set of resource entries that each point to a resource in the computing environment. In one aspect, the second data structure is leveraged by the operating system to manage access by the one or more processes to the resources.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings, which are incorporated in and constitute a part of this specification, show certain aspects of the present invention and, together with the description, help explain some of the principles associated with the invention.

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with certain aspects related to the invention.

I. CONCEPTUAL OVERVIEW

Methods and systems consistent with certain aspects of the present invention provide resource sharing in a multi-process computing environment through file descriptor isomorphism. In one aspect, a Global File Descriptor (GFD) table is logically positioned between one or more process and resource descriptor tables. The GFD table includes a set of GFD entries that each include a reference to a resource listed in one or more resource descriptor tables. Processes associated with the process descriptor tables generate GFD's that reference a particular GFD entry in the GFD table.

Each GFD entry in the GFD table includes GFD fields that include information associated with resource sessions between a process and a particular resource. In one aspect, the GFD fields may include: a pointer to an entry in a particular resource descriptor table corresponding to a resource; data reflecting a number of times the corresponding GFD entry has been opened to reference the resource; flag data associated with each open call for the GFD entry; and data reflecting the source of open calls for a corresponding GFD. Through this arrangement, methods and systems may allow multiple processes to establish sessions with a resource via the GFD table while allowing each resource and process to maintain consistent state data corresponding to these sessions. In another aspect of the present invention, methods and systems enable resources to establish sessions with GFD entries to gain access to another resource.

The foregoing discussion is intended to introduce and provide initial clarity for some of the aspects associated with the present invention. Further details of the above-mentioned functionality and additional aspects, features, and embodiments of the present invention are described below.

II. EXEMPLARY SYSTEM ENVIRONMENT

Figure 1:
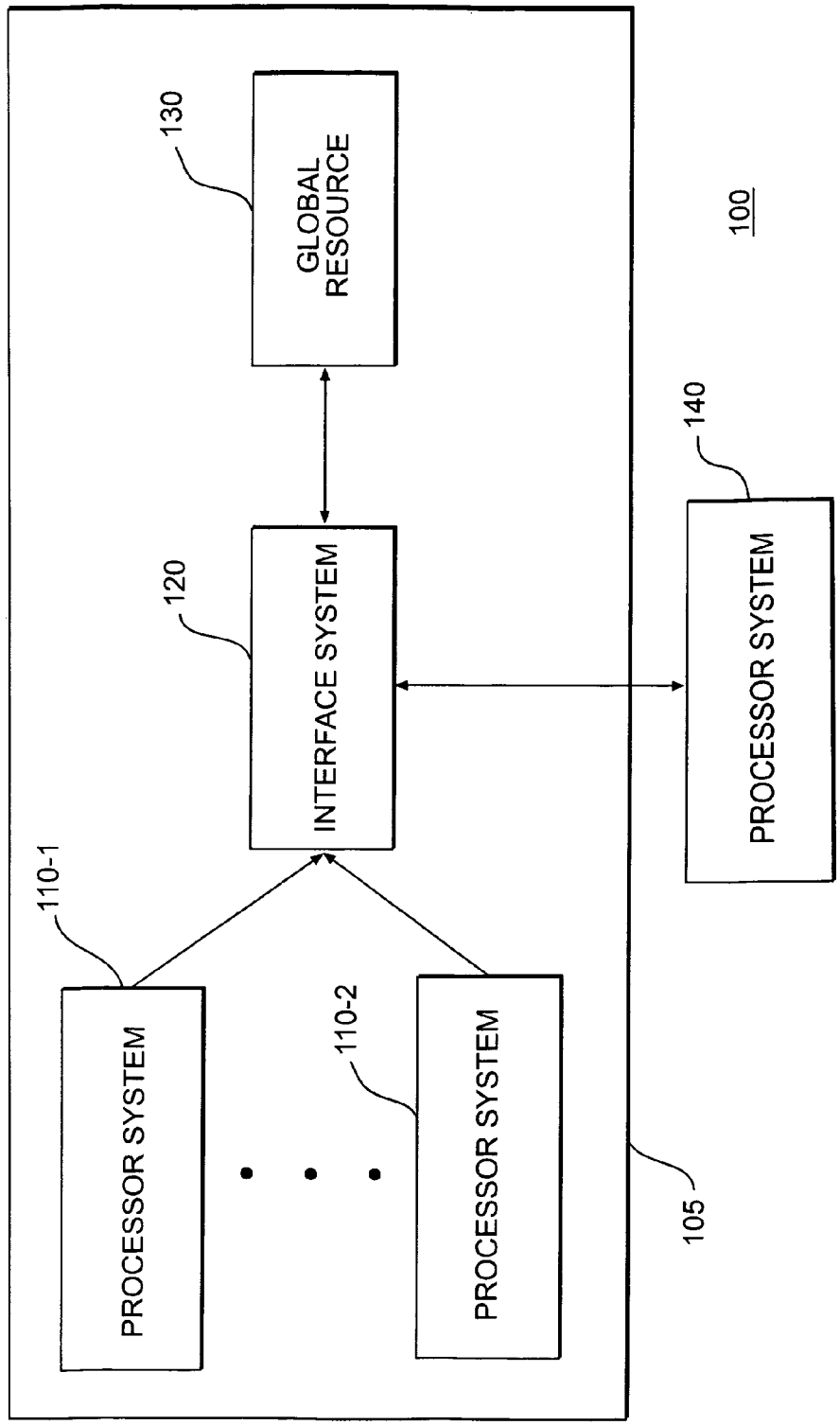
FIG. 1 illustrates a block diagram of an exemplary system environment consistent with certain aspects related to the present invention.

FIG. 1 illustrates a block diagram of an exemplary system environment 100 consistent with certain aspects related to the present invention. As shown, environment 100 includes a multiprocessing computing system 105, processor systems 110, interface system 120, global resource 130, and processor system 140.

Computing system environment 100 may be configured to allow computing system 105 to operate as a standalone system that performs one or more processes through processor systems 110, global memory 130, and processor system 140. In such instances, processor systems 110 and/or 140 may access common resources, such as global resource 130, to perform one or more operations. Alternatively, environment 100 may be configured to allow computing system 105 to operate in conjunction with other computing systems that exchange information and commands, and share common resources, such as global resource 130. The above exemplary arrangements are not intended to be limiting and other configurations for computing system environment 100 may be implemented by methods and system consistent with aspects of the present invention. Further, although FIG. 1 shows components of environment 100 as separate entities, the components may be hardware and/or software that share part of the same computing system or memory system.

Computing system 105 may be a computing system that is associated with different types of computing applications, such as a data storage environments that implement many storage adapter boards for controlling and/or managing access to storage devices and other processing devices. For example, aspects of the present invention may be employed in a system environment similar to that disclosed in U.S. Pat. No. 6,687,903 ("the '903 patent") issued to Steven R. Chalmer et al. on Feb. 3, 2004, entitled "Inhibiting Starvation in a Multitasking Operating System," and is herein incorporated by reference in its entirety. For instance, computing system 105 may be associated with of an RFID adapter board used in connection with a Symmetrix® Data Storage device provided by EMC Corporation of Hopkinton, Mass.

Figure 2:
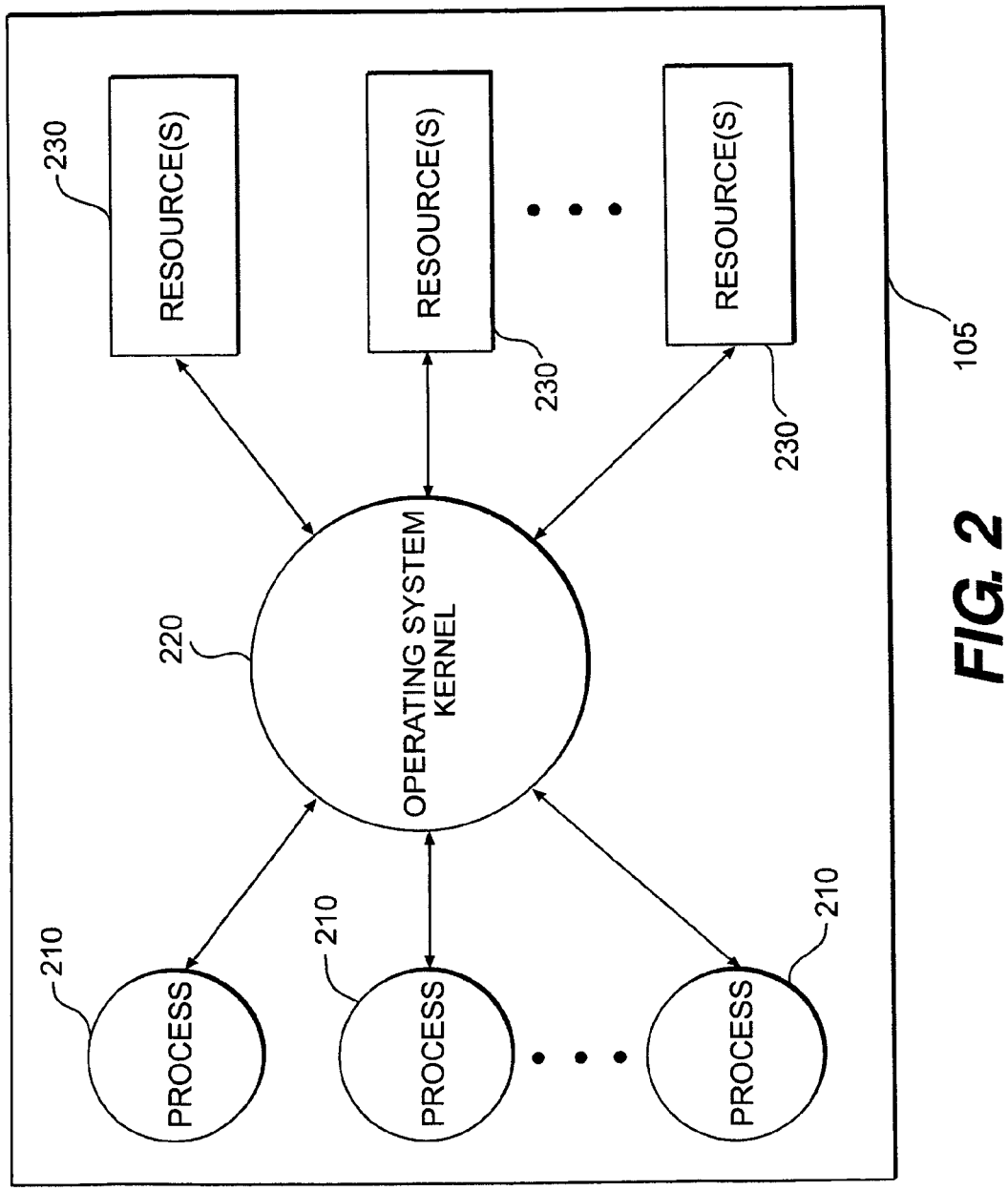
FIG. 2 illustrates a block diagram of an exemplary logical structure associated with the exemplary system environment consistent with certain aspects related to the present invention.

Processor systems 110 may each include one or more processors that execute software that performs one or more processes. Processors suitable for the execution of such software may include, for example, both general and special purpose microprocessors, and any one or more processors of any kind of digital computer. A processor consistent with aspects of the present invention may receive instructions and data from a memory device and may also include, or be operatively coupled to receive data from or transfer data to, one or more memory devices. Processor systems 110 may include one or more memory devices storing software executable by a processor and data accessible and leveraged by a processor. These memory devices may include non-volatile memory, such as mass storage devices (e.g., magnetic, magneto-optical disks, optical disks, CD-ROM, DVD-ROM, etc.), and semiconductor memory devices (e.g., EEPROM, EPROM, and flash memory devices. Additionally, to provide interaction with a user, processor systems 110 may each be implemented with a computer having a display device such as a Cathode Ray Tube (CRT) or Liquid Crystal Display (LCD) monitor, or the like, for displaying information to the user. Further, such a computer may have an input device (e.g., mouse, keyboard, touchscreen, etc.) by which the user may provide input to the computer. Other kinds of input/output devices may be implemented to provide interaction with a user. Although FIG. 2 shows two processing systems 110, additional or fewer processor systems 110 may be implemented by computing system 105.

Interface system 120 may be a processing system that includes hardware and/or software for managing the exchange of data between processor systems 110 and 140 and global resource 130. For example, interface system 120 may manage one or more processes performed by processing systems 110 and 140. Thus, interface system 120 may include one or more memory devices that store operating system software that, when executed by a processor, performs operating system-type tasks. These tasks may include standard operating system operations, such as managing input and output operations and controlling accesses between processing system 110 and 140 and resources within computing system environment 100. Additionally, the operating system software implemented by interface system 120 may include program code that manages driver software that controls hardware devices within computing system environment 100. Further, interface system 120 may execute operating system software that allows processor systems 110 to each perform multiprocessing, multitasking, and/or multithreading operations. Thus, processor systems 110 may individually perform processes that interact with other processes within each processor system 110 and/or between multiple processor systems 110. Further, interface system 120 enables processor systems 110 to perform processes concurrently with one or more processes executed by processor system 140.

Global resource 130 may be one or more resources that are shared among processor systems 110 and/or processor system 140. A resource, as the term is used herein, may be any type of software or hardware component that may be used by another computer-implemented component to perform some process. For example, global resource 130 may include one or more files that are accessible by processor systems 110 and 140. Further, global resource 130 may include one or more devices, such as a output devices (e.g., printers, display devices, etc.), input devices (e.g., keyboard, mouse, etc.) memory devices (e.g., disk drives), and any similar of hardware device. Each of these devices may have corresponding driver software executing in interface system 120. Moreover, global resource 130 may include software that is leveraged by processor systems 120 and/or 140 to perform certain operations. For example, global resource 130 may include sockets that are software objects that connect processes executed by processor systems 130 and/or 140 to particular network protocols. The above described types of resources are exemplary and not intended to be limiting. That is, other types of hardware and/or software-based resources may be implemented by global resource 130.

Processor system 140 may be a computing system that operates external to computer system 105. Processor system 140 may include one or more processors that execute software that performs one or more processes that interact with processor systems 110 and global resource 130 through interface system 120. Processors suitable for the execution of such software may include, for example, both general and special purpose microprocessors, and any one or more processors of any kind of digital computer. Further, processor system 140 may include one or more memory devices that store software and data used by processors to perform the above-noted processes. Although FIG. 1 shows one processor system 140, methods and systems consistent with certain aspects of the present invention may include additional processor systems 140.

As explained, aspects of the present invention enable processor systems 110 to share one or more resources implemented by computer system 105. In certain aspects, operating system software executed by interface system 120 may facilitate these resource sharing processes. FIG. 2 illustrates an exemplary view of the logical components consistent with these aspects of the present invention. As shown, one or more processes 210 may be executing during runtime of computer system 105. Processes 210 may be each executed concurrently with other processes. Processes 210 may reflect software processes executed by processor systems 110, such as application program processes. In one aspect, one or more processes 210 may request access to one or more resources 230 to complete one or more tasks.

Resources 230 may each reflect one or more different types of resources, such as input/output devices, drivers, sockets, etc. Resources 230 may represent hardware and/or software that is executed by a processor to perform a resource process. To manage access to resources 230, interface system 120 may implement an operating system kernel 220 that processes data exchanges between processes 210 and/or resources 230. Kernel 220 may perform one or more resource sharing processes consistent with certain aspects of the present invention. As such, aspects of the present invention may be logically represented as software code that is programmed within an operating system layer logically position between an application layer (hosting processes 210) and a hardware/software device layer (hosting resources 230). Because system 105 may be associated with the systems described in '903 patent, previously incorporated by reference in its entirety, Kernel 220 may be associated with the kernel discussed in the '903 patent. For example, in certain embodiments, kernel 220 may run on a variety of different hardware platforms, such as a Power PC based Symmetrix adapter board used in a Symmetrix data storage device provided by EMC Corporation of Hopkinton, Mass.

III. CONFIGURING FILE DESCRIPTOR TABLES

Figure 3:
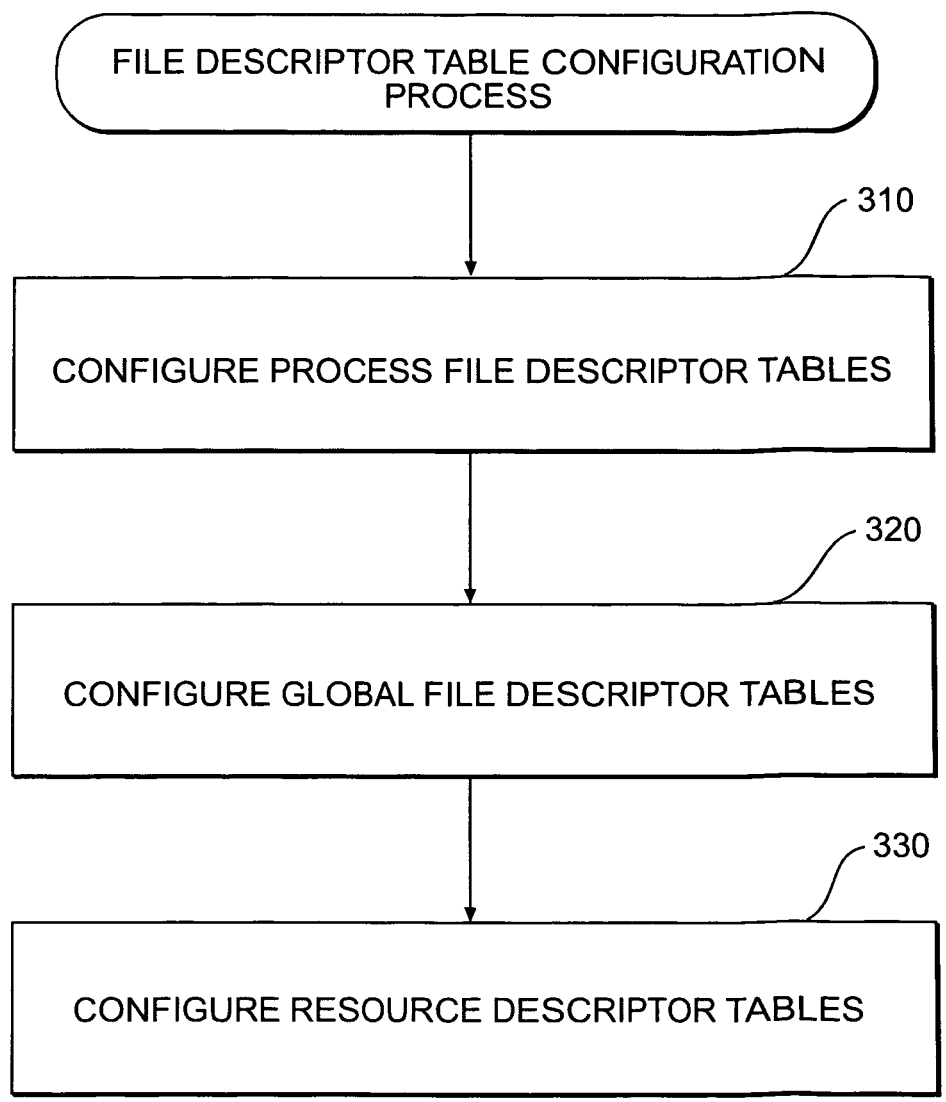
FIG. 3 illustrates a flowchart of an exemplary file descriptor table configuration process consistent with certain aspects related to the present invention.

As explained, methods and systems consistent with aspects of the present invention leverage operating system program code to manage access to one or more resources in a computing system environment. To facilitate such resource sharing operations, aspects of the invention implement file descriptor tables associated with processes and resources that may be leveraged by computing system 105. In one aspect, methods and systems also implement a global file descriptor table that is used by kernel 220 to manage access to resources 230. Accordingly, methods and systems consistent with aspects of the present invention configure these file descriptor tables prior to and/or during runtime of computing system 105. The term "table" in connection with the file descriptor tables described herein is not intended to be limiting. That is, file descriptor tables may be configured in a table format, an array format, a linked list format, and any other type of data structure arrangement that enables methods and systems of the present invention to manage relationships between logical components of computing system environment 100. The file descriptor tables provide a mapping between user level file descriptors (i.e., file descriptors associated with processes 210) to internal file descriptors. To illustrate these aspects of the invention, FIG. 3 shows a flowchart of an exemplary file descriptor table configuration process 300 that may be performed during runtime of computing system 105. Computing system 105 may leverage one or more of its components to perform file descriptor table configuration process 300, such as operating system kernel 220 executed by interface system 120.

In one aspect, during runtime of one or more processes 210, one or more process file descriptor tables are configured (Step 310). A process file descriptor table for each process 210 may be generated executed by processor systems 120. Each process file descriptor table is a data structure stored in a memory device and includes an indexed arrangement of process file descriptors associated with each process 210 being performed by processor systems 120. Each entry in the process file descriptor tables reflects a relationship between a corresponding process file descriptor and a GFD entry in a GFD table. In certain aspects, processes 220 may be exposed to the indexes in each process file descriptor table. Thus, users operating processor systems 110 may view and configure the process file descriptors. Each process file descriptor table is configured to have up to a maximum number of entries, exemplary labeled "MAXPROCFDS." In one aspect, a user or software process may implement certain software call commands that expose an interface to the entries of the process file descriptor tables. For example, in a Unix environment, each index in the process file descriptor tables may be defined as an "SINT32" interface, which is the interface exposed from "open" and "socket" system calls.

The file descriptor table configuration process 300 also includes configuring a GFD table (Step 320). The GFD table is a data structure stored in a memory device and includes an arrangement of GFD entries that each reference an entry in a resource descriptor table that includes indexed references to one or more resources 230.

Figure 4:
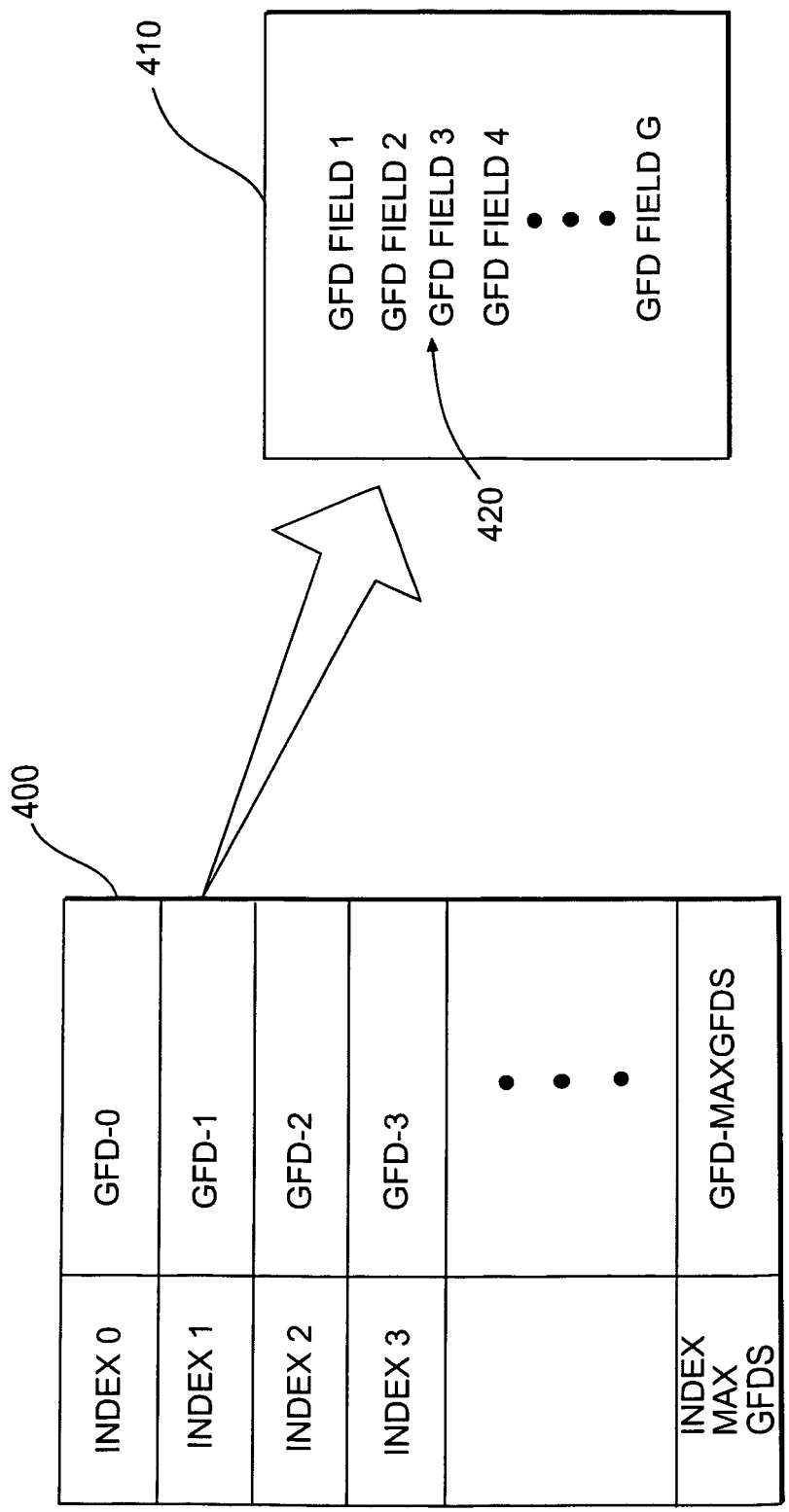
FIG. 4 illustrates a block diagram of an exemplary Global File Descriptor (GFD) table consistent with certain aspects related to the present invention.

The GFD table designates the maximum number of file descriptors that are open throughout computing system 105 at any given time, exemplary labeled "MAXGFDS." In accordance with certain aspects of the present invention, kernel 220 may configure each indexed GFD entry with a structure including a number of GFD fields. FIG. 4 illustrates a block diagram of an exemplary GFD table 400 that includes a MAXGFD number of indexed entries 410. Each entry 410 may include a number of GFD fields 420 that include information used by methods and systems to manage access to resources 230. GFD fields 420 may include, for example, a resource field, an open number field, a flags field, and a data field. The resource field, exemplary labeled f_resource, may include a pointer to an entry in a particular resource file descriptor table. The open number field, exemplary labeled f_nopen, reflects a number of times the respective GFD entry has been opened. Accordingly, the f_nopen field reflects the number of process file descriptors currently pointing to the respective GFD. The flags field, exemplary labeled f_flags, is a field used by internal subsystems of computing system 105 (e.g., resources 230) to track flags associated with each open call to the GFD, such as a read only and read/write restrictions associated with a particular resource access request. The data field, exemplary labeled f_data, reflects a data pointer field that is also used by internal subsystems of computing system 105. The f_data field may be used by resources 230 and/or processes 210 to track internal data on a per-GFD basis. For example, a flash memory driver that may be opened by multiple processes leverages the f_data field to recognize the source of each open call to the driver.

As explained, the GFD table includes indexed entries that reference entries in a resource file descriptor table. As such, process 300 also includes configuring resource descriptor tables (Step 330). Aspects of the present invention enable kernel 220 to generate a resource descriptor table for each type of resource implemented by computing system 105, such as a driver table, a sockets table, a files table, etc. Each resource file descriptor table includes indexed entries that point to a particular resource. For example, the resource file descriptor tables may include a driver descriptor table having a certain number of entries that each point to a particular driver implemented by computing system 105. Other types of resource file descriptor tables may be implemented, such as a sockets descriptor table and a data file descriptor table. As such, methods and systems consistent with aspects of the present invention are not limited to the above examples.

IV. EXEMPLARY RESOURCE ACCESS PROCESS

Figure 5:
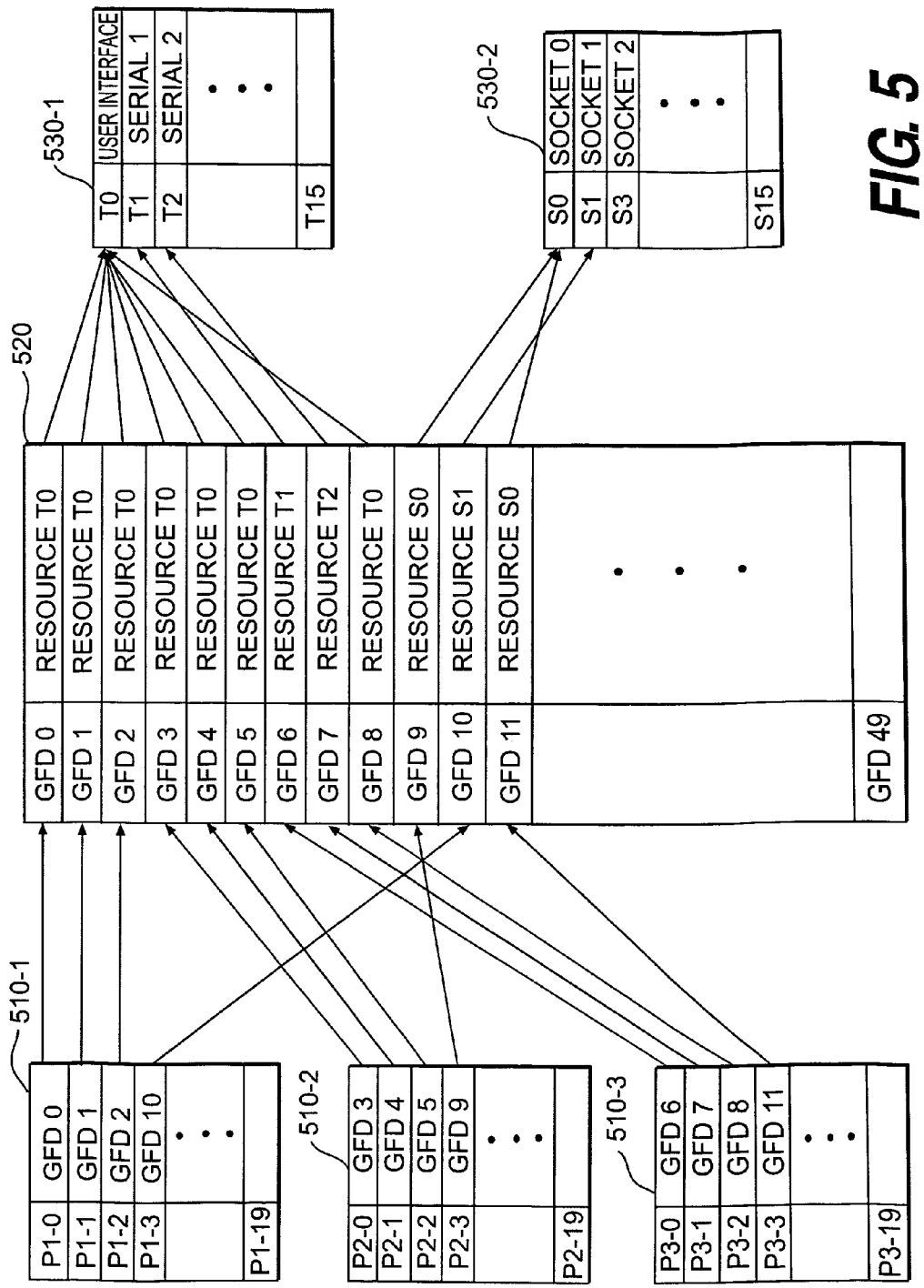
FIG. 5 illustrates a block diagram of exemplary file descriptor tables consistent with certain aspects related to the present invention.

During runtime of computing system 105, processor systems 110 execute processes 210 to perform various tasks. These tasks may require access to information or devices that are governed by resources 230. As such, methods and systems consistent with aspects of the present invention allow operating system kernel 220 to leverage file description tables to manage these operations. In accordance with certain aspects, methods and systems enable processes 210 to share resources 230 while maintaining consistent state information associated with each resource. To better illustrate these aspects of the invention, FIG. 5 shows a block diagram of exemplary file description tables that may be generated by kernel 220 during runtime of computing system 105. As shown in this example, three process description tables 510-1, 510-2, and 510-3 are generated. Each of these tables correspond to respective processes 210 that may be executed by one or more processor systems 110. Further in this example, process descriptor tables 510-1 to 510-3 are configured with twenty indexed entries (e.g., P1-0 to P1-19; P2-0 to P2-19; and P3-0 to P3-19). Thus, each table is associated with a MAXPROCFDS value of twenty. FIG. 5 also shows a GFD table 520 including, for example, fifty indexed entries (e.g., GFD0 to GFD 49). Two resource descriptor tables 530-1 and 530-2 are shown, each having sixteen indexed entries (e.g., T0 to T15 and S0 to S15). Resource descriptor table 530-1 may be a device driver descriptor table including references that point to a particular device driver for a particular device, such as a user interface, serial ports, etc. Resource descriptor table 530-2 may be a sockets descriptor table including references that point to particular sockets implemented by computing system 105. The arrangement of the descriptor tables in FIG. 5 are exemplary and are not intended to be limiting. Methods and systems consistent with aspects of the present invention may operate with any number of process descriptor tables and resource descriptor tables associated with different types of processes and resources, respectively.

As shown in FIG. 5, process descriptor tables 510-1 to 510-3 include GFD references that point to a particular GFD entry. For example, index. P1-0 in process descriptor table 510-1 includes a pointer to GFD entry GFD 0, while index P2-3 in process descriptor table 510-2 includes a pointer to GFD entry GFD 9. Each of the entries in GFD table 520 includes references that point to particular entries in resource descriptor tables 530-1 and 530-2. For example, GFD 0 points to resource entry T0 in resource descriptor table 530-1, while GFD 11 points to resource entry S1 in resource descriptor table 530-2. Each entry in GFD table 520 is created when a process 210 generates a request for a resource. Thus, a resource session is created for each resource that is to be accessed. Kernel 220 uses the GFD fields included in each GFD entry to track and manage these sessions. Kernel 220 may close each resource session when no more processes 210 request access to a respective resource. For instance, resource T0 in resource descriptor table 530-1 has seven process requests from processes 210 reflected by seven GFD entries in GFD table 520 pointing to this resource (i.e., GFD entries GFD 0-5, 8, and 9). Thus, the sessions associated with resource T0 closes when no more GFD entries point to that resource. Through this exemplary arrangement, kernel 220 may effectively manage access to resources 230.

Figure 6:
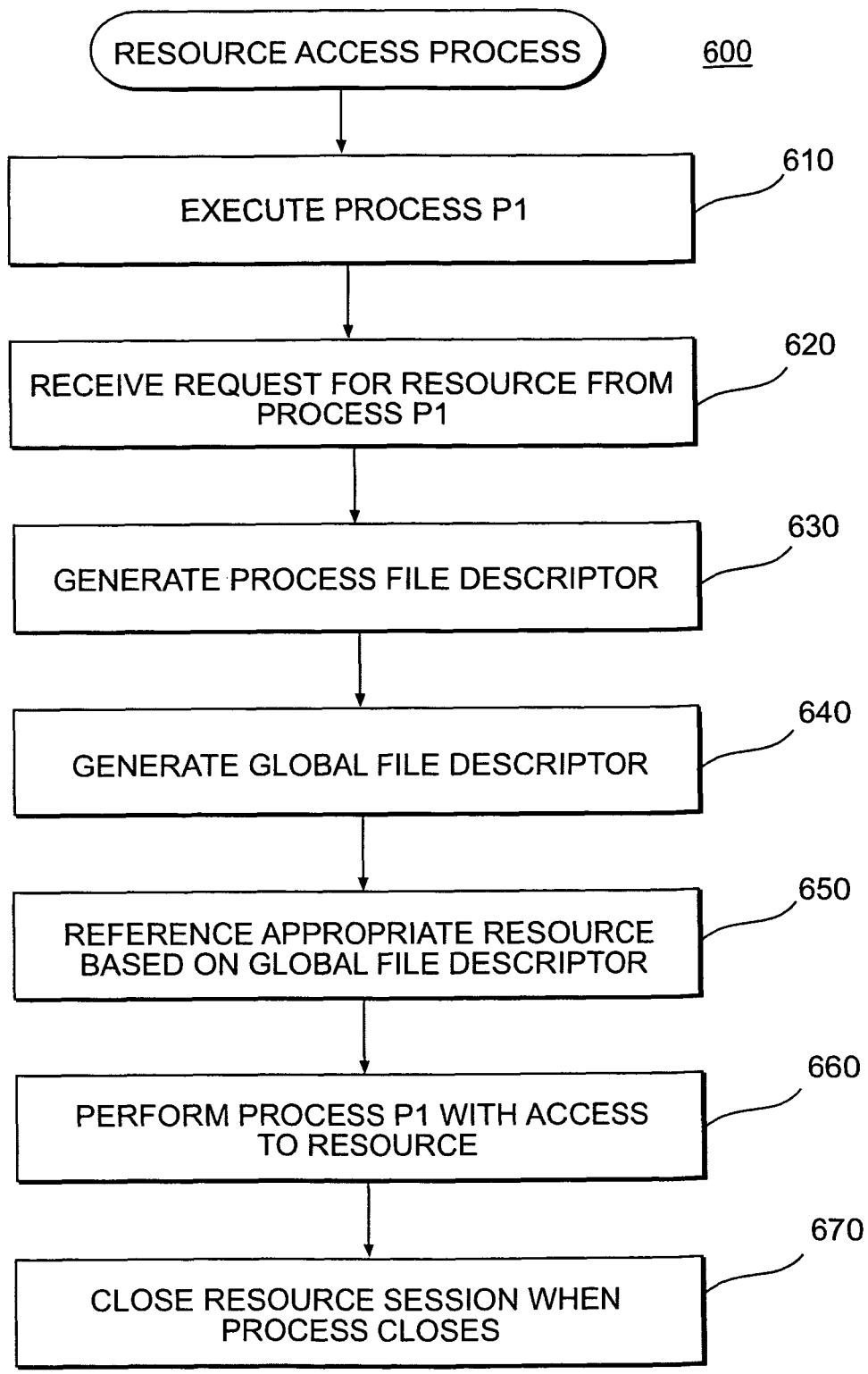
FIG. 6 illustrates a flowchart of an exemplary resource access process consistent with certain aspects related to the present invention.

FIG. 6 illustrates a flowchart of an exemplary resource access process 600 consistent with these exemplary aspects of the present invention. The description of process 600 is described with reference to FIG. 5. At some point during runtime of computing system 105, a first process P1 may require access to a resource 230 (Step 610). As such, process P1 may generate an open call associated with this request (e.g.; ptr=drv_open("resource T0") (Step 620). An entry in a process file descriptor table for first process P1 is created corresponding to the type of resource requested. In this example, first process P1 may request access to a user interface resource. Accordingly, methods and systems recognize that the driver for this resource is needed to process the request. As a result, a session for this resource is created and a GFD reference in P1's process descriptor table is generated by operating system kernel 220 (Step 630). Based on an open call for the resource from process P1, kernel 220 generates a corresponding GFD entry in table 520 that includes a reference pointing to the requested resource, in the event no corresponding GFD entry already exists (Step 640). For example, in FIG. 5, process entry P1-0 includes a pointer to GFD 0 in GFD table 520, which references resource entry T0 in table 530-1. In certain aspects, kernel 220 may format the GFD fields corresponding to the generated GFD entry. These fields may be configured based on the resource requested. For example, the f_driver field for GFD may point to T0 of resource descriptor table 530-1. Also, f_nopen field may be set to "1," indicating the number of times GFD 0 has been opened by processes 210. Each resource session is associated with a corresponding GFD entry in the GFD table 520. Thus, when a session closes (e.g., no processes or resources have closed or no longer requires access to a resource), the corresponding GFD entries may be removed from the GFD table. It should be noted that although Steps 630 and 640 are shown in FIG. 6 as separate steps, kernel 220 may generate the GFD entry concurrently when generating the process file descriptor.

Once the GFD entry is created, kernel 220 may reference the requested resource using the resource pointer generated in the GFD fields for the created GFD entry (Step 650). Having established a reference chain between the first process P1's request (e.g., process entry P1-0) and the appropriate resource (e.g., driver entry T0 in FIG. 5), kernel 220 allows the first process P1 to perform its task by accessing the requested resource (Step 660). When the first process P1 no longer requires access to the requested resource, kernel 220 may close the session associated with this resource and first process P1 (Step 670).

V. EXEMPLARY RESOURCE SHARING PROCESS

Figure 7:
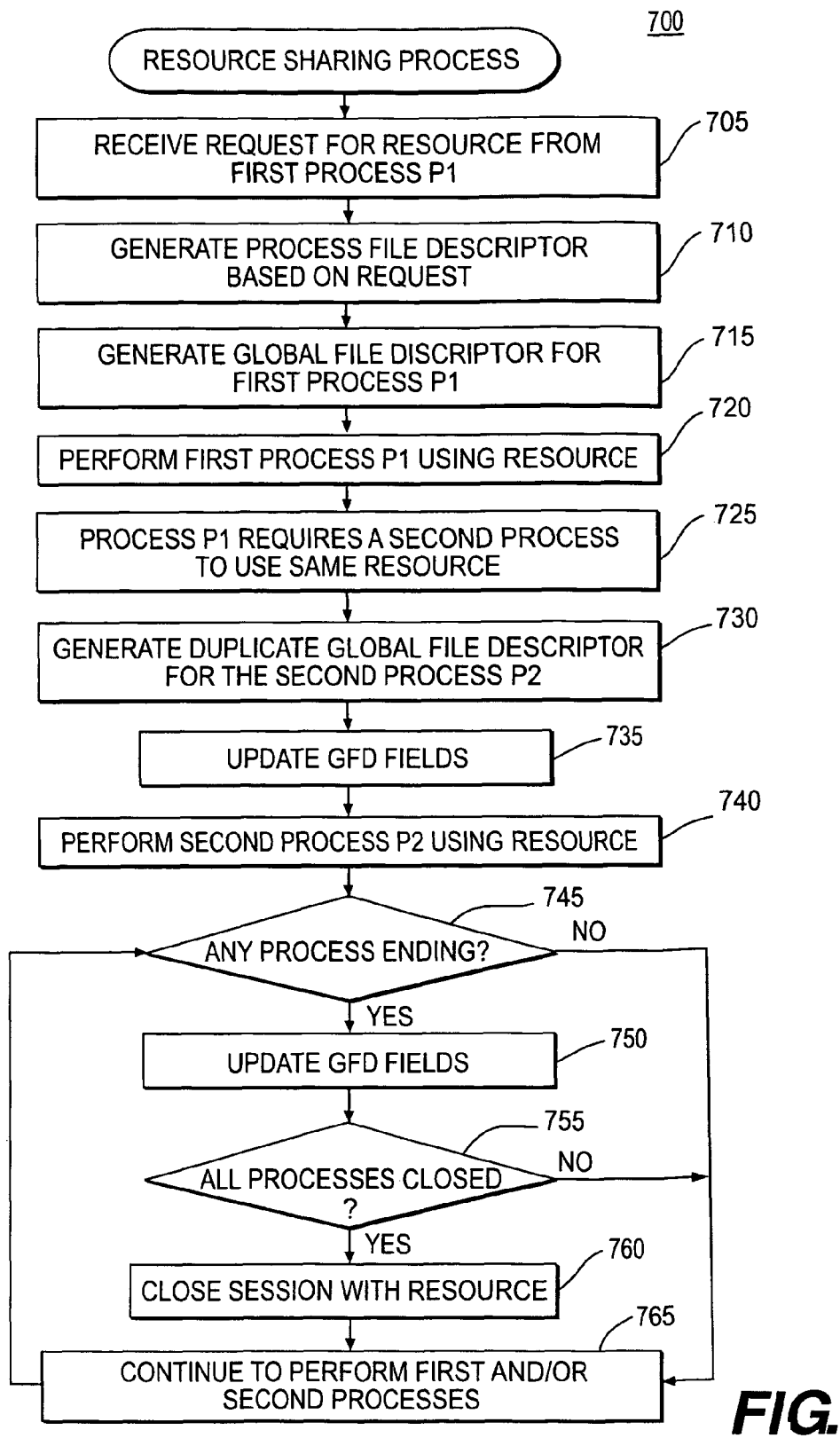
FIG. 7 illustrates a flowchart of an exemplary resource sharing process consistent with certain aspects related to the present invention.

In accordance with another aspect of the present invention, kernel 220 may utilize the GFD fields for each created GFD entry to allow processes 210 to share the same GFD entries in a GFD table. Thus, instead of allocating new GFD entries to separate processes 210 that request access to the same resources, methods and systems duplicate a GFD pointer in the process descriptor tables such that multiple processes 210 may access the same GFD entry to gain access to the same resource 230. FIG. 7 illustrates a flowchart of an exemplary resource sharing process 700 consistent with these aspects of the present invention. Process 700 may begin during runtime of computing system 105 when a first process P1 requests access to a resource 230 (Step 705). Based on the request, operating system kernel 220 may create a corresponding process file descriptor in a process descriptor table for process P1 (Step 710). Process P1 may then generate an open call using the GFD in the process file descriptor for this resource. In response, kernel 220 generates a GFD entry in the GFD table that includes a pointer to an entry in a resource descriptor table referencing the requested resource (Step 715). As noted previously, kernel 220 may generate the GFD entry concurrently when generating the process file descriptor. As such, the process file descriptor includes a GFD that references the generated GFD entry. Kernel 220 may format the appropriate GFD fields in the created GFD entry to allow it to manage access to the requested resource. Once the appropriate file descriptors are created and formatted, first process P1 is performed using the requested resource (Step 720). At some point during runtime, process P1 may require that a second process P2 access the same resource being used by first process P1 (Step 725). Accordingly, process P1 generates a duplicate GFD entry that references the GFD entry in the GFD table pointing to the same resource. For example, process P1 may initiate a "dupglobalfd" function that duplicates a GFD referenced in its process file descriptor table. Subsequently, process P1 may pass the duplicate GFD to second process P2 using appropriate inter-process message passing commands and protocols implemented by computing system 105. Second process P2 receives the duplicate GFD and creates a corresponding process file descriptor referencing the duplicate GFD in its respective process file descriptor table.

Once the duplicate GFD entry is created in second process P2's descriptor table, process P2 may request access to the same resource accessed by process P1. In one aspect, process P2 generates an open call that is received by kernel 220. Kernel 220 determines that the GFD entry identified in the call is already associated with a session established with another process (e.g., process P1). As such, kernel 220 may update the GFD fields for that GFD entry (Step 735). In one aspect of the invention, kernel 220 may increase the f_nopen field by one value indicating that another process (e.g., process P2) has issued an open call for this GFD entry. For example, the f_nopen GFD field for the GFD entry may include a value of "2," indicating the two processes having references to the GFD entry.

Once the appropriate GFD fields are updated, second process P2 may access the requested resource through the duplicate GFD (Step 740). At some point, one of the processes accessing the resource may close. For example, kernel 220 may receive an indication that a process (e.g., P1 or P2) is ending (Step 745). If no process is closing (Step 745; No), processes P1 and P2 continue to execute (Step 765). On the other hand, if a process is closing, (Step 745; Yes), kernel 220 determines which GFD entry is associated with the closing process. Once identified, kernel 220 may update the GFD fields for that GFD entry in the GFD table (Step 750). For instance, kernel 220 may decrease the f_nopen field value by one for each process that is closing and has a reference to that particular GFD entry. Thus, if process P1 closes while process P2 still requires access to the resource, the f_nopen field for the GFD entry pointing to the resource is reduced by one. If during runtime, kernel 220 determines that all processes have closed for a particular GFD entry, the session for the resource referenced by the GFD entry is closed. Thus, during process 700, kernel 220 determines whether the f_nopen field for a GFD entry associated with a closing process is equal to or less than a predetermined value (e.g., zero) (Step 755). If so (step 755; Yes), kernel 220 closes the session established for the resource referenced by the GFD entry associated with the closing process(es) (Step 760). Accordingly, the GFD entry may be removed from the GFD table.

Accordingly, methods and systems consistent with aspects of the present invention enable multiple processes to share a source through a common GFD entry in a GFD table. Using the GFD fields in the common GFD entry, kernel 220 allows each process that is accessing the same resource through the GFD table to have access to current state information associated with the resource. For example, the f_flags and f_data GFD fields for a common GFD entry may include state information associated the shared resource (e.g., access protections, restrictions, etc. for each process and resource unique to the GFD descriptor). Thus, changes to resource state information caused by a first process (e.g., P1) are seen by a second process (e.g., P2) that subsequently accesses the same resource. This may be implemented through the GFD fields included in the common GFD table entry pointing to the shared resource.

Figure 8:
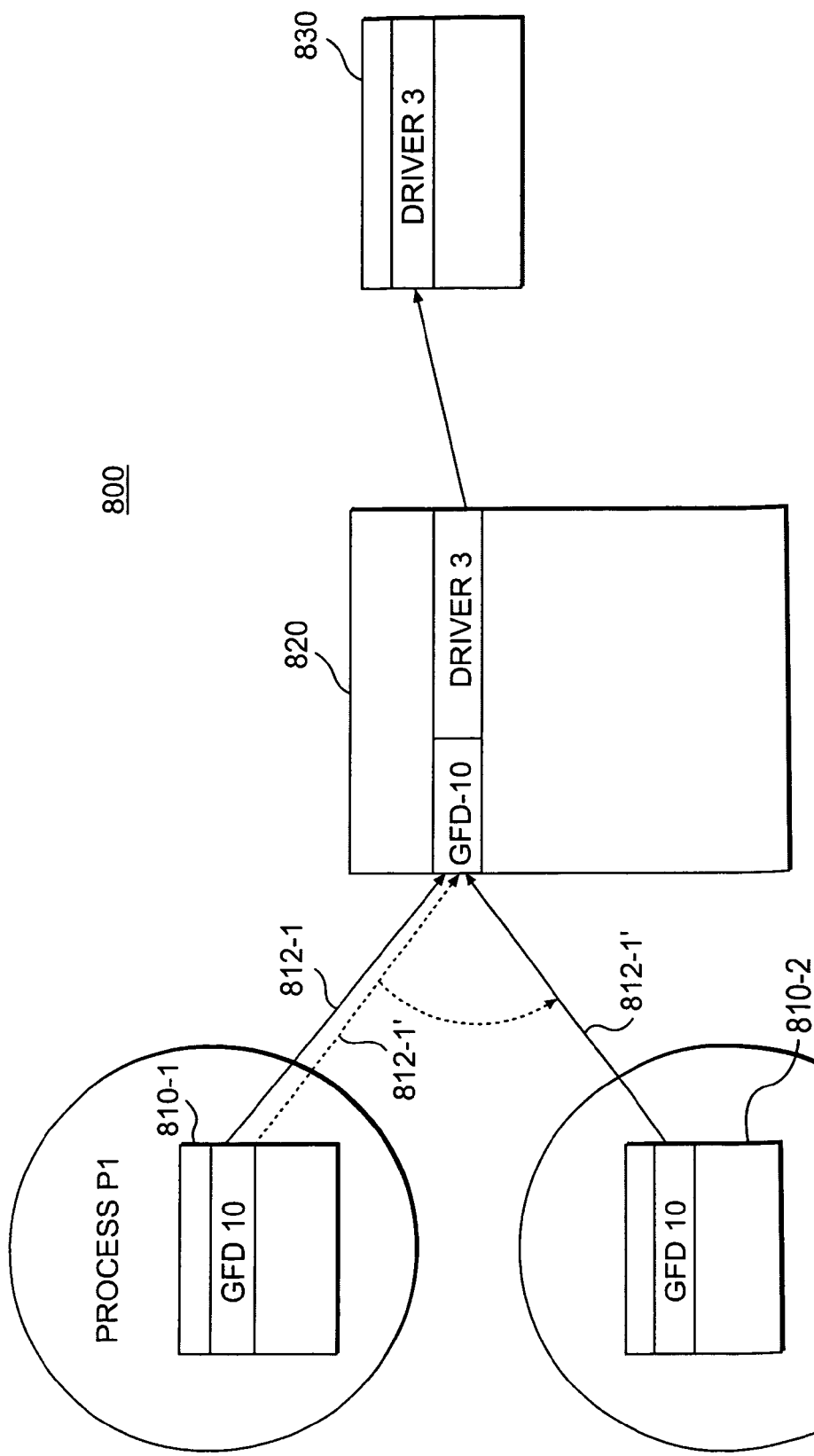
FIG. 8 illustrates a block diagram of an exemplary resource sharing environment consistent with certain aspects related to the present invention.

To further illustrate the above-mentioned aspects of the present invention, FIG. 8 shows a block diagram of an exemplary resource sharing environment 800 reflecting a multi-process resource sharing session. As shown, environment 800 includes two process file descriptor tables 810-1 and 810-2 associated with processes P1 and P2 respectively. Environment 800 further includes a GFD table 820 and a resource descriptor table 830. In this example, GFD 10 points to a "driver 3" entry in resource descriptor table 830. Process descriptor table 810-1 initially includes a reference to GFD entry GFD 10 in GFD table 820. This is reflected by pointer 812-1. When process P2 requires access to the same resource, process P1 may generate a duplicate GFD entry 812-1' pointing to GFD 10 for resource driver 3. Process P1 then passes duplicate GFD entry 812-1' to process P2. Once received, process P2 may generate a process descriptor table entry in table 810-2 that includes a GFD pointer 812-1' to GFD 10. As a result, both processes P1 and P2 may access resource "driver 3" through GFD 10 in GFD table 820. And because processes P1 and P2 share the same GFD entry, the GFD field data associated with the session established with resource "driver 3" is shared among the processes. Accordingly, methods and systems consistent with aspects of the present invention enable kernel 220 to manage access by multiple processes (e.g., first and second processes P1 and P2) to a first resource (e.g., "driver 3") using a common GFD entry such that the processes operate with the most current state information associated with the first resource.

VI. EXEMPLARY RESOURCE STACK PROCESS

Figure 9:
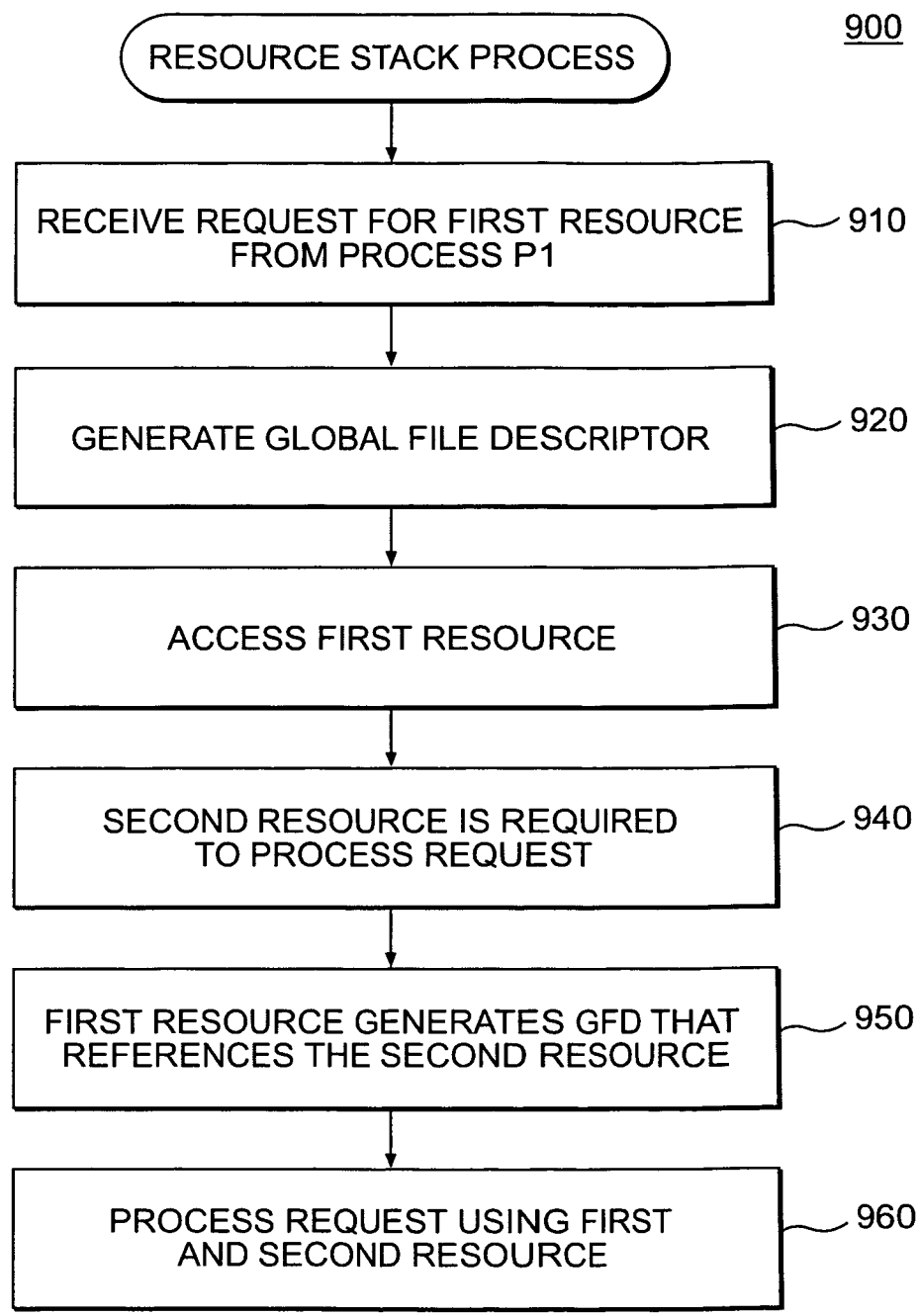
FIG. 9 illustrates a flowchart of an exemplary stack resource process consistent with certain aspects related to the present invention.

In another aspect of the invention, methods and systems may allow a resource 230 to leverage the GFD table to access other resources 230 during runtime of computing system 105. FIG. 9 illustrates a flow chart of a resource stack process 900 consistent with certain aspects of the present invention. Process 900 may begin in a manner similar to the resource access process steps described above in connection with FIG. 6. For example, during runtime, kernel 220 may receive a request for a first resource from a process P1 (Step 910). Based on the request, a GFD entry is created that points to the first resource indexed in a resource descriptor table if no such GFD entry exists (Step 920). Alternatively, if a session exists for the resource (i.e., a GFD entry already exists for another process that has access to the first resource in the GFD table), kernel 220 may update the GFD field information for the GFD entry to reflect multiple processes are accessing the first resource. Subsequently, kernel 220 manages access by process P1 to the first resource using the GFD entry (Step 930). In certain instances, a resource may require information or access controlled by a second resource in order to process the operations requested by process P1 (Step 940). Accordingly, the first resource may generate a GFD open call that causes a GFD entry in the GFD table to be created (Step 950). Alternatively, if a session for the second resource is already being managed by kernel 220 (i.e., a GFD entry exists for another process or resource that has access to the first resource), the first resource GFD call may be directed to an already existing GFD entry in the GFD table. In response, the appropriate GFD fields are updated. Once the GFD entry is referenced by the first resource, the second resource may be accessed to process the request associated with the first resource (Step 960).

Figure 10:
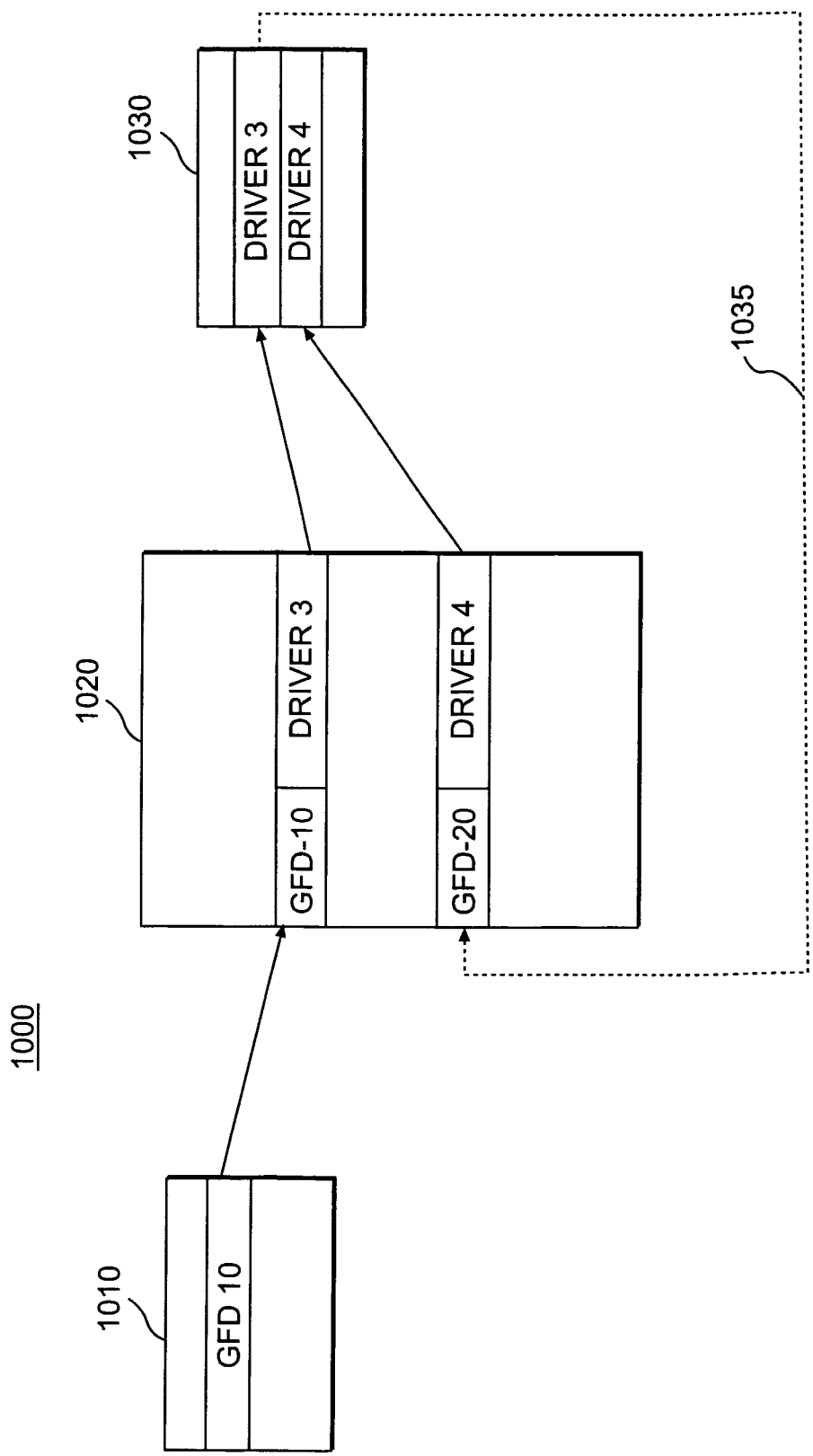
FIG. 10 illustrates a block diagram of an exemplary stack resource environment consistent with certain aspects related to the present invention.

To manage stacked resources in manner discussed above, kernel 220 may leverage the GFD fields for the GFD entries to track the source and number of GFD calls. For example, kernel 220 may update the f_nopen GFD field for a GFD entry when it is referenced by a resource descriptor table. Further, the f_data field may include information identifying the source of an open call to track multiple levels of resources for managing sessions to each of these resources. To better illustrate the above mentioned aspects of the present invention, FIG. 10 shows a block diagram of a resource stack process environment 1000 consistent with exemplary aspects of the present invention. As shown, environment 1000 includes a process file descriptor table 1010, a GFD table 1020, and a resource descriptor table 1030. Process file descriptor table 1010 includes a reference to GFD 10 in GFD table 1020. A first resource (i.e., "driver 3") is referenced by GFD 10 in table 1020. In accordance with the resource stacking aspects described above, "driver 3" may require access to a second resource (i.e., "driver 4"). As such, resource "driver 3" may generate a GFD call 1035 that causes kernel 220 to create a new entry in GFD table 1020. In this instance, GFD 20 is created with a reference to "driver 4." Using this GFD entry, resource "driver 3" is able to access "driver 4." Although environment 1000 shows "driver 4" being located in the same resource descriptor table 1030 as "driver 3," aspects of the invention allow for stacked resources to be located in other resource descriptor tables.

As explained, kernel 220 may use GFD fields to manage the stacked resources during runtime. For example, in environment 1000, when access to resource "driver 4" is no longer required by resource "driver 3," the corresponding session for "driver 4" may be closed. In the event, however, that other processes 210 or resources 230 have associated sessions with "driver 4," kernel 220 may not close the session. Instead, the f_nopen field for GFD 20 may be decreased by one when the process executed by "driver 3" for access to "driver 4" is closed. Further, in circumstances where the session for "driver 3" is hierarchically above "driver 4," (i.e., driver 3 requires use of driver 4 to perform its operations), sessions with lower level resources will not be closed until the upper level resource closes them. Thus, "driver 3" may control when the sessions for "driver 4" are closed. Accordingly, aspects of the present invention allow computing system 105 to created layered resources that are not bound to a single process. Further, session with the layered resources are not closed when corresponding processes are closed unless the upper layer resource closes them. Therefore, in instances where multiple layers of resource are created, any parent resource (i.e., a resource having a session with another resource) may close child resources (i.e., a resource referenced by a parent resource). The child resource, however, may not be closed unless allowed by the parent resource. Further, aspects of the present invention may implement synchronization operations that enable kernel 220 to track which child resources are also parent resources for other child resources. In such instances, kernel 220 may determine whether a parent resource may close a child resource when the child resource is referencing a child resource of its own. For example, kernel 220 may be configured to perform synchronization operations that ensure that the first child resource closes its child resources prior to allowing the parent resource to close the session for the first child resource.

VII. CONCLUSION

For purposes of explanation only, certain aspects of the present invention are described herein with reference to the components illustrated in FIGS. 1 and 2. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 3, 6, 7, and 9 are exemplary and not intended to be limiting. Thus, other method steps may be used, and even with the methods depicted in FIGS. 3, 6, 7, and 9, the particular order of events may vary without departing from the scope of the present invention. Moreover, certain steps may not be present and additional steps may be implemented in FIGS. 3, 6, 7, and 9. Also, the processes described herein are not inherently related to any particular apparatus and may be implemented by any suitable combination of components. Additionally, although aspects of the present invention are described with reference to operating system kernel 220, other types of software may be implemented to manage access to resources 230. For example, other types of operating system programs may be implemented that execute programs to create and manage a GFD table for facilitating access to resources 230.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What is claimed is:

1. A computer-implemented method for providing shared access to resources in a computing environment, the method comprising:
   managing access of a first process to a first resource through a Global File Descriptor (GFD) that points to a first GFD entry in a GFD table, the first GFD entry including a reference that points to a first resource entry in a resource descriptor table referencing the first resource;
   generating, by the first resource, a second GFD that points to a second GFD entry in the GFD table, the second GFD entry including a reference that points to a second resource entry in the resource descriptor table referencing a second resource; and
   managing access to the first and second resources using the first and second GFD entries in the GFD table, wherein the GFD table is common to both the first resource and the second resource and is leveraged by the first resource to access the second resource, wherein the first process accesses the first resource using the GFD table and wherein the first resource accesses the second resource using a pointer from the first resource entry in the resource descriptor table that points back to the second GFD entry referencing the second resource in the GFD table.

2. The computer-implemented method of claim 1, wherein at least one GFD field associated with the first GFD entry in the GFD table includes at least one of:
   a first field including a pointer to the first resource,
   a second field including a value reflecting a number of times the first resource is opened,
   a third field including flags associated with the first GFD entry in the GFD table, and a fourth field including data associated with a source of open calls directed to the first resource.

3. The computer-implemented method of claim 1, wherein managing access includes:
    updating at least one GFD field associated with the first GFD entry in the GFD table based on a second process requesting access to the first resource using the GFD table.

4. The computer-implemented method of claim 3, wherein the at least one GFD field reflects a number of processes that request access to the first resource and wherein updating the at least one GFD field includes:
    updating the at least one GFD field to indicate that the first and second process are accessing the first resource.

5. The computer-implemented method of claim 4, wherein updating the at least one GFD field includes:
    determining that at least one of the first and second processes are closing; and
    updating the at least one GFD field to indicate that at least one of the first and second processes no longer are accessing the first resource.

6. The computer-implemented method of claim 4, further including:
    closing a session for the first resource when the at least one GFD field indicates there are no pending open calls for the first resource from any processes in the computing environment.

7. The computer-implemented method of claim 1, wherein managing access includes:
    updating GFD fields included in the first and second GFD entries to reflect a number of open calls to the first and second resources, respectively.

8. The computer-implemented method of claim 1, wherein managing access includes:
    updating a GFD field associated with the second GFD entry to reflect that the first resource is the source of an open call for the second resource.

9. A system that provides shared access to resources in a computing environment, comprising:
    a memory including:
    a Global File Descriptor (GFD) table that includes a set of GFD entries, and
    a resource descriptor table that includes resource entries associated with resources in the computing environment; and
    a processor that executes program code for managing access by a first process to a first resource and a second resource by:
        managing access of the first process to the first resource through a first GFD that points to a first GFD entry in the GFD table, the first GFD entry including a reference that points to a first resource entry in the resource descriptor table referencing the first resource;
        generating, by the first resource, a second GFD that points to a second GFD entry in the GFD table, the second GFD entry including a reference that points to a second resource entry in the resource descriptor table referencing the second resource; and
        managing access to the first and second resources using the first and second GFD entries in the GFD table, wherein the GFD table is common to both the first resource and the second resource and is leveraged by the first resource to access the second resource, wherein the first process accesses the first resource using the GFD table and wherein the first resource accesses the second resource using a pointer from the first resource entry in the resource descriptor table that points back to the second GFD entry referencing the second resource in the GFD table.

10. The system of claim 9, wherein the program code manages access to the first resource by:
    configuring GFD fields associated with the first GFD entry in the GFD table that include information that identifies at least one of:
        a number of open calls directed to the first resource,
        a pointer to the first resource entry,
        data reflecting access characteristics associated with the first resource and the first process, and
        data reflecting the source of any open calls directed to the first resource.

11. The system of claim 9, wherein the processor executes program code that creates GFD entries in the GFD table in response to open calls for resources originated by resources referenced by the resource descriptor table.

12. The system of claim 11, wherein the processor executes program code to manage access to the resources by updating GFD field data associated with each created GFD entry in the GFD table, the GFD field data reflecting at least one of:
    a source of the open calls,
    a number of times a GFD entry has been opened in response to the open calls, and
    a pointer to corresponding resource entries in the resource descriptor table.

13. A computer-readable memory encoded with executable code, the computer-readable memory comprising:
    executable code that managing access of a first process to a first resource through a Global File Descriptor (GFD) that points to a first GFD entry in a GFD table, the first GFD entry including a reference that points to a first resource entry in a resource descriptor table referencing the first resource;
    executable code that generates, by the first resource, a second GFD that points to a second GFD entry in the GFD table, the second GFD entry including a reference that points to a second resource entry in the resource descriptor table referencing a second resource; and
    executable code that manages access to the first and second resources using the first and second GFD entries in the GFD table, wherein the GFD table is common to both the first resource and the second resource and is leveraged by the first resource to access the second resource, wherein the first process accesses the first resource using the GFD table and wherein the first resource accesses the second resource using a pointer from the first resource entry in the resource descriptor table that points back to the second GFD entry referencing the second resource in the GFD table.

14. The computer-readable memory of claim 13, further comprising:
    executable code that updates GFD fields included in the first and second GFD entries to reflect a number of open calls to the first and second resources, respectively.

15. The computer-readable memory of claim 13, further comprising:
    executable code that updates a GFD field associated with the second GFD entry to reflect that the first resource is the source of an open call for the second resource.

16. The computer-readable memory of claim 13, wherein at least one GFD field associated with the first GFD entry in the GFD table includes at least one of:
    a first field including a pointer to the first resource,
    a second field including a value reflecting a number of times the first resource is opened, a third field including flags associated with the first GFD entry in the GFD table, and a fourth field including data associated with a source of open calls directed to the first resource.

17. The computer-readable memory of claim 13, further comprising:

executable code that updates at least one GFD field associated with the first GFD entry in the GFD table based on a second process requesting access to the first resource using the GFD table.

18. The computer-readable memory of claim 17, wherein the at least one GFD field reflects a number of processes that request access to the first resource, the computer-readable medium further comprising:

executable code that updates the at least one GFD field to indicate that the first and second process are accessing the first resource.

19. The computer-readable memory of claim 18, further comprising:

executable code that determines that at least one of the first and second processes are closing; and executable code that updates the at least one GFD field to indicate that at least one of the first and second processes no longer are accessing the first resource.

20. The computer-implemented method of claim 18, further comprising:

executable code that closes a session for the first resource when the at least one GFD field indicates there are no pending open calls for the first resource from any processes in the computing environment.

* * * * *